United States Patent [19]

Parkinson et al.

[11] Patent Number: 5,439,978
[45] Date of Patent: Aug. 8, 1995

[54] OXAZINE -AND OXAZOLINE-BASED COPOLYMERS USEFUL AS ANTIELECTROSTATIC AGENTS AND POLYMERIC COMPOSITIONS PREPARED THEREWITH

[75] Inventors: Dean B. Parkinson, deceased, late of Redwood City, by Elfriede Parkinson, executrix; Asutosh Nigam, Fremont; Subhash Narang, Redwood City, all of Calif.

[73] Assignee: SRI International, Menlo Park, Calif.

[21] Appl. No.: 104,216

[22] Filed: Aug. 9, 1993

[51] Int. Cl.$^6$ ............................................. C08L 81/06
[52] U.S. Cl. ................................. 525/185; 525/186; 525/403; 525/404; 525/410
[58] Field of Search ............... 525/404, 403, 185, 186, 525/410

[56] References Cited

U.S. PATENT DOCUMENTS

| | | | |
|---|---|---|---|
| 3,470,267 | 9/1969 | Litt | 585/660 |
| 3,639,395 | 2/1972 | Tomalia | 548/238 |
| 3,670,046 | 6/1972 | Tomalia | 525/505 |
| 3,738,961 | 6/1973 | Tomalia | 528/211 |
| 3,741,944 | 6/1973 | Tomalia | 526/285 |
| 4,366,307 | 12/1982 | Singh | 528/373 |
| 4,737,574 | 4/1988 | Goel | 528/374 |
| 4,759,908 | 7/1988 | Incorvia | 422/14 |
| 4,954,579 | 9/1990 | Thill et al. | 525/421 |

FOREIGN PATENT DOCUMENTS

| | | |
|---|---|---|
| 0287092A2 | 10/1988 | European Pat. Off. . |
| 0434223A1 | 6/1991 | European Pat. Off. . |
| 0450724A1 | 9/1991 | European Pat. Off. . |
| WO92/07895 | 5/1992 | WIPO . |

OTHER PUBLICATIONS

Kobayashi, et al. Macromolecules, 1990, 23, 1586–89.
Miyamoto, et al. Macromolecules 1992, 25, 5818–85.
Kobayashi, et al. Macromolecules, 1992 25, 3232–36.
Miyamoto, et al. Macromolecules, 1989 22, 1604–07.
Miyamoto, et al. Polymer Journal, v. 24, 1992, 406–409.
T. Nishikubo et al., "Novel syntheses of alternating copolymers with amide and thioether linkages by polyaddition reactions of bifunctional cyclic iminoethers with dithiols", (1984) *Makromol. Chem.* 185:1307–1316.
S. Kobayashi et al., "Block and Graft Copolymers of 2-Oxazolines", (1985) *Makromol. Chem. Suppl.* 12:11–24.
C. Maechling-Strasser et al., "Synthesis and adsorption of a poly(N-acetylethyleneamine)-polyethyleneoxide-poly (N-acetylethyleneimine) triblock-copolymer at a silica/solution interface. Influence of its preadsoprtion on platelet adhesion and fibrinogen adsorption", (1989) *J. Biomed. Mater. Res.* 23:1395–1410.
A. Dworak et al., "Star polymers and block copolymers of 2-oxazolines using chloroformates as initiators", (1991) *Makromol. Chem.* 192:437–445.

*Primary Examiner*—James J. Seidleck
*Assistant Examiner*—I. Zemel
*Attorney, Agent, or Firm*—Dianne E. Reed

[57] ABSTRACT

Novel polymers for rendering a nonconductive material conductive are disclosed. The polymers may be block copolymers comprised of a first block of polyoxazine or polyoxazoline and a second block comprising a thioether linkage-containing polyalkylene glycol or $$[-O-\underset{R^1}{CH}-\underset{R^2}{CH}-S(-XS)_{p}-\underset{R^3}{CH}-\underset{R^4}{CH}-]$$

wherein $R^1$, $R^2$, $R^3$, $R^4$, X and P are as defined herein or an oxazoline polymer with pendant chains consisting of polyethylene oxide and polythioether. Composites of a nonconductive materials and the novel antielectrostatic polymers, uses of these composite materials, as well as methods for rendering nonconductive materials conductive by incorporating therein an antielectrostatic polymer are also disclosed.

30 Claims, No Drawings

OXAZINE -AND OXAZOLINE-BASED COPOLYMERS USEFUL AS ANTIELECTROSTATIC AGENTS AND POLYMERIC COMPOSITIONS PREPARED THEREWITH

TECHNICAL FIELD

The present invention relates generally to novel polymers useful as antielectrostatic agents, and more particularly relates to novel oxazine- and oxazoline-based block copolymers. The invention additionally relates to the use of these block copolymers in the manufacture of conductive polymer composites. As such, the invention encompasses novel composite materials and manufacturing methods as well as novel antielectrostatic agents.

BACKGROUND

Antielectrostatic agents are used in a number of contexts and in conjunction with a wide variety of materials. Depending on the use, it may be necessary to provide antielectrostatic agents which are thermally stable, stable to chemicals with which the agents come into contact, and which may be incorporated into existent materials or structures without deterioration of mechanical properties. In addition, in the preparation of conductive composite materials, compatibility and processability of the antielectrostatic agent with the base material is required as well.

One important area in which antielectrostatic agents are needed—and the context from which the present invention derives—is in the interior of fuel lines and other fuel system parts. Typically, the plastics which are used as the interior coatings are selected such that corrosion and degradation resistance are provided, as is chemical resistance and flexural toughness. Nylon 12 is one such material which has been found to be particularly advantageous in this regard. However, a serious problem which has arisen with Nylon 12 is the buildup of electrostatic charge during use. This is obviously an undesirable and potentially very dangerous problem.

One approach to eliminate electrostatic discharge in Nylon 12 has been the incorporation of carbon black to render the plastic more conductive. However, the incorporation of carbon black was found to lead to a loss of needed mechanical properties such as flexibility and elongation due to very high loading required to achieve conductivity.

A second approach to eliminate electrostatic discharge in plastics is set forth in European Patent Publication Nos. 283,985 and 287,092. Briefly, this method involves the use of polyether-based polymers and blends thereof with thermoplastic materials such as polystyrene, styrene copolymers, polyvinyl chloride, and polypropylene to provide electrostatic discharge protection. However, these materials are not suitable for use with Nylon 12 because of its hydrophobicity and the need for high processing temperatures.

The present invention addresses the aforementioned issues insofar as antielectrostatic agents are now provided which are thermally stable and compatible with hydrophobic materials such as Nylon 12. The novel antielectrostatic agents have been found to provide a number of additional advantages as well. Primarily, they are readily processable with Nylon 12 or other polymeric materials, even at temperatures of 150° C. to 250° C., or higher. The antielectrostatic agents of the invention are resistant to swelling in organic fluids such as gasoline and are useful in preparing composite materials which have superior mechanical properties, i.e., the materials will not tend to crack or otherwise rupture at high temperatures or when subjected to routine stress.

OVERVIEW OF RELATED ART

U.S. Pat. No. 3,470,267 to Litt et al. describes the use of oxazine-derived homopolymers or copolymers of poly(N-acyl trimethyleneimine) in treating synthetic or natural materials to enhance their antistatic properties. Litt et al. found little or no antistatic activity in oxazoline polymers.

U.S. Pat. No. 4,366,307 to Singh et al. relates to the Permapol® family of polymers. The polymers are polyalkyl ethers and thioethers with, preferably, hydroxyl termination, and there may be as few as two sulfur atoms in the ether/thioether chain. U.S. Pat. No. 4,759,908 to Incorvia relates to corrosion inhibiting solutions containing the polymers of the '307 patent, a solvent, and a fatty ester or fatty amine.

The following references relate to copolymers of bis-oxazoline monomers: U.S. Pat. Nos. 3,639,395, 3,670,046, 3,738,961, and 3,741,944 to Tomalia et al. (which describe copolymers of bis-oxazoline monomers with dithiols, and the use of such compounds as curing agents); U.S. Pat. No. 4,737,574 to Goel (which also describes copolymers of bis-oxazoline with polythiols, and possibly block copolymers); T. Nishikubo et al., *Makromol. Chem.* 185:1307–1316 (1984); S. Kobayashi et al., *Macromolecules* 23:1586–1589 (1990) (which describes block copolymers of oxazines and oxazolines with polyoxytetramethylene); M. Miyamoto et al., *Macromolecules* 22:1604–1607 (1989) (which describes preparation of an A-B-A block copolymer of 2-oxazoline and poly(oxyethylene)); A. Dworak et al., *Makromol. Chem.* 192:437–445 (1991) (which describes star polymers and block copolymers of 2-oxazolines with poly(ethylene oxide)); C. Maechling-Strasser et al., *J. Biomed. Mater. Res.* 23:1395–1410 (1989) (which relates to a triblock copolymer of oxazoline and poly(ethylene oxide)); and, S. Kobayashi et al., *Makromol. Chem. Suppl.* 12:11–24 (1985) (which describes polymerization of 2-oxazolines induced by alkyl sulfonates or alkyl halides).

European Patent Publication No. 287,092, inventor Yu, discloses nonionic copolymers of ethylene oxide with cyclic monomers as antistatic agents. The most preferred comonomer is propylene oxide. The method by which the antistatic agent of this invention is synthesized is by simultaneously adding ethylene oxide and comonomer to a reaction vessel thereby resulting in a random copolymer.

European Patent Publication No. 434,223, inventors Saegusa et al., describes block copolymers formed from (a) a 2-oxazoline or a 1,3-oxazine monomer, and (b) a sulfonate ester terminated polyalkylene glycol. Tosylates are specifically disclosed at the top of page 5. The block copolymers are stated to be useful as surfactants.

SUMMARY OF THE INVENTION

Accordingly, it is a primary object of the invention to address the aforementioned need in the art by providing novel antielectrostatic agents useful in the manufacture of conductive composite materials.

It is another object of the invention to provide a block copolymer comprised of a first block which is selected from the group consisting of polyoxazine, polyoxazoline, and combinations thereof, and a second block which is a thioether linkage-containing polyalkylene glycol.

It is another object of the invention to provide a block copolymer comprised of a first block which is selected from the group consisting of polyoxazine, polyoxazoline, and combinations thereof, and a second block comprising monomer units having the structure

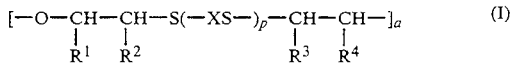

wherein $R^1$, $R^2$, $R^3$ and $R^4$ are independently selected from the group consisting of hydrogen and lower alkyl, X is $-R^m-(Z)_1-R^n-$ wherein $R^m$ and $R^n$ are branched or linear lower alkylene, Z is O or S, and 1 is 0 or 1; preferably, X is selected from the group consisting of $-C_2H_4-$, $-C_4H_8-$, $-C_2H_4-O-C_2H_4-$, $-C_2H_4-S-C_2H_4-$ and $-C_2H_4-S-CH_2-C(CH_3)H-$. Typically, although not necessarily, "a" is selected to provide the copolymer with a molecular weight in the range of about 500 to 50,000, but is preferably an integer in the range of 2 to 40, inclusive, and p is 0 or 1. The monomer units of the first and second blocks may be the same or different.

It is a further object of the invention to provide a polymer formulated from monomer units having the structure

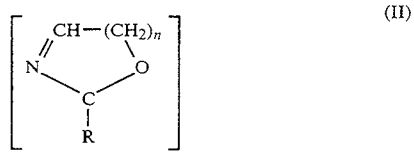

wherein n is 1 or 2, and R is selected from the group consisting of hydrogen, linear or branched aliphatic and/or sulfide linkages, alicyclic and aromatic hydrocarbon radicals having 1 to 20 carbon atoms, polyethylene imine, polyethylene oxides, and polythioethers, each containing not more than about 20 carbon atoms. The polymer may be a homopolymer or it may be a copolymer, i.e., containing different monomer units encompassed by structure (II).

It is another object of the invention to provide a copolymer comprising a first segment formulated from monomeric units having the structure (II) wherein n and R are as just defined, and a second segment comprising an amine-terminated polyethylene oxide. Again, the first and second segments may be either homopolymeric or copolymeric.

It is yet another object of the invention to provide a composite of a first polymeric material and an antielectrostatic agent comprising one of the aforementioned polymers or copolymers.

It is an additional object of the invention to provide a method for rendering a substantially nonconductive material conductive by incorporating therein an antielectrostatic agent as described herein.

Further, it is an object of the invention to provide a method for making a conductive polymeric composite.

It is a further object of the invention to provide a method for providing shielding from electromagnetic radiation by interposing a conductive polymeric composite between the subject and the source of radiation.

Detailed Description of the Invention

I. Definitions

Before describing the present invention in detail, it is to be understood that this invention is not limited to the particular monomer structures, polymeric materials, processing conditions, or the like, as such may vary. It is also to be understood that the terminology used herein is for the purpose of describing particular embodiments only, and is not intended to be limiting.

It must be noted that, as used in this specification and the appended claims, the singular forms "a," "an" and "the" include plural referents unless the content clearly dictates otherwise. Thus, for example, reference to "an electrostatic agent" includes mixtures of such agents, reference to "a plasticizer" includes mixtures of plasticizers, and the like.

In this specification and in the claims which follow, reference will be made to a number of terms which shall be defined to have the following meanings:

The term "polymer" is intended to include both oligomeric and polymeric species, i.e., compounds which include two or more monomeric units, which may be a homopolymer or a copolymer. When a single generic structure is shown, e.g., as in formula (II), it is to be understood that the polymers described may contain two or more different monomeric units represented by the single generic structure. A "conductive polymer" is one which possesses conducting as opposed to insulating electrical-transport properties.

The term "homopolymer" is a polymer incorporating a single species of monomer units. The term "copolymer" is a polymer constructed from two or more chemically distinct species of monomer units in the same polymer chain. A "block copolymer" is a polymer which incorporates two or more segments of two or more distinct species of homopolymers or copolymers.

The term "antielectrostatic" as used herein means that property of an agent which renders the agent unable to sustain the buildup of electrostatic charge.

The term "alkyl" as used herein refers to a branched or unbranched saturated hydrocarbon group of 1 to 24 carbon atoms, such as methyl, ethyl, n-propyl, isopropyl, n-butyl, isobutyl, t-butyl, octyl, decyl, tetradecyl, hexadecyl, eicosyl, tetracosyl and the like. Preferred alkyl groups herein contain 1 to 12 carbon atoms. The term "lower alkyl" intends an alkyl group of one to six carbon atoms.

The term "alkylene" as used herein refers to a difunctional saturated branched or unbranched hydrocarbon chain containing from 1 to 24 carbon atoms, and includes, for example, methylene ($-CH_2$), ethylene ($-CH_2-CH_2-$), propylene ($-CH_2-CH_2-CH_2-$), 2-methylpropylene [$-CH_2-CH(CH_3)CH_2-$], hexylene [$-(CH_2)_6-$] and the like. "Lower alkylene" refers to an alkylene group of one to six carbon atoms.

II. The Novel Antielectrostatic Agents

The first group of antielectrostatic agents are block copolymers which contain a first block of polyoxazolines, polyoxazines, or combinations thereof, generally formulated from monomer units having the general structure (II) wherein n and R as defined above, and a second block of a thioether linkage-containing polyalkylene glycols. The polyalkylene glycols useful in synthesizing the thioether linkage-containing polyalkylene glycol blocks of the copolymers are well known in the art and are formulated from monomer units having the general structure

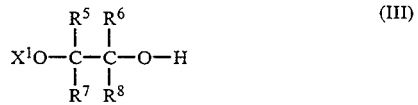
(III)

wherein $R^5$, $R^6$, $R^7$ and $R^8$ are independently selected from the group consisting of H and $C_1$ to $C_{12}$ linear, branched or cyclic alkyl, provided that one is not H. Preferred hydrocarbon radical substituents are $CH_3$, $CH_3CH_2$— and $CH_3CH_2CH_2$—. $X^1$ is preferably H but may be a linear or branched hydrocarbon radical, typically alkyl, more typically lower alkyl. The polymers deriving from these monomers thus comprise recurring units having the structure

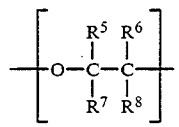

The second group of antielectrostatic agents are block copolymers which contain a first block of polyoxazines, polyoxazolines, or combinations thereof, as shown in structure (II) above, and a second block comprising a polythioether. Preferably, R is hydrogen or lower alkyl. Preferred polythioethers are as those shown in structure (I) above. The polythioethers and methods of synthesis thereof have been disclosed in U.S. Pat. No. 4,366,307 to Singh et al., which is hereby incorporated by reference.

Preferably, these block copolymers are A-B-A block copolymers, wherein A represents a polyoxazoline, polyoxazine, or combinations thereof, and the B block represents a polythioether or thioether linkage-containing polyoxyalkylene block. More preferably, the A block is a polyoxazoline. Although the molecular weight of the copolymer may be any suitable value, it is preferably between about 500 and 50,000, more preferably between about 1,000 and 50,000 and most preferably between about 2,000 and 10,000. The overall ratio of A block to B block is in the range of about 1:1 to 100:1 and preferably is between about 20:1 and 80:1.

The third group of antielectrostatic agents are polymers formulated from monomer units having the structure

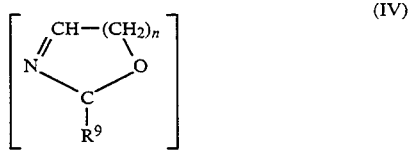
(IV)

wherein n is 1 or 2, and $R^9$ is selected from the group consisting of polyethylene imine, polyethylene oxide, polythioether, i.e., moieties containing recurring —($CH_2CH_2NH$)—, —($CH_2CH_2O$)— or —(($CH_2$)$_n$—S)— units, and thioether linkage-containing polyalkylene glycols or combinations thereof. As with the substituent R defined earlier herein, it is preferred that $R^9$ contain 1 to 40, preferably 1 to 20, carbon atoms.

The fourth group of antielectrostatic agents are copolymers comprising a first monomeric species as shown in structure (II) above, and a second species comprising an amine-terminated polyethylene oxide. Such polymers are of the "AB" type and have a molecular weight, with the ratio of the A block to the B block in the range of about 20:1 to 1:20.

It should be noted that, in summary, all of the polymers of the invention involve oxazine and/or oxazoline units with a side chain R (or $R^9$) having not more than about 40, preferably not more than about 20, carbon atoms. It should also be noted that all polymers of the invention typically have molecular weights in the range of about 500 to 500,000, preferably in the range of about between about 1,000 and 50,000, and most preferably between about 2,000 and 10,000.

III. Methods of Making the Novel Antielectrostatic Agents.

Oxazoline and oxazine monomers may be synthesized by any known method in the art, including dehydrohalogenation of haloamides, dehydration of hydroxyamides, isomerization of N-acylaziridines, cyclization of hydroxyalkyl isocyanides, reaction of nitriles with aminoalkyl alcohols, reaction of nitriles with epoxides or reaction of ethyl imidate with aminoalkyl alcohols, or the like. Such methods are reviewed by S. Kobayashi, *Prog. Polym. Sci.* 5:751-783 (1990).

Polythioethers used in the claimed invention may be obtained commercially or by a variety of synthetic methods well known in the art. See, U.S. Pat. No. 4,366,307 to Singh et al. Similarly, polyethylene imine may be obtained commercially, e.g., BASF (Clifton, N.J.).

Thioether linkage-containing polyalkylene glycols utilized in the claimed invention may be obtained commercially or by a variety of synthetic methods. Examples of commercially available thioether linkage-containing polyalkylene glycols include Permapol ® P-900 (MW=500) and Permapol ® P-905 (MW=1000) (Products Research & Chemical Corp., Glendale, Calif.). Permapol ® 900 (MW=500) is a diol, and Permapol ® 905 (MW=1000) is a triol, of Permapol ® P-3 polythioether which contains recurring units having the following basic structure

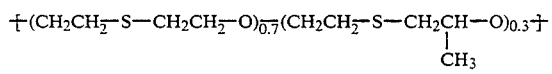

Synthetic methods by which thioether linkage-containing polyalkylene glycols may be obtained may be found in Inoue, S., and Aida, T., *Ring-Opening Polymerization* Vol. 1, Chapter 4, pp.; 185-298, Elsevier, 1984.

Synthesis of the copolymer containing polythioether or polyoxyalkylene blocks comprises reacting the polymer of the first block with a sulfonate ester-terminated polythioether of the general formula

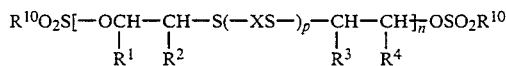

or a polyalkylene glycol of the general formula

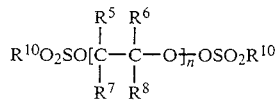

wherein $R^1$, $R^2$, $R^3$, $R^4$, $R^5$, $R^6$, $R^7$ and $R^8$ are as defined above. $R^{10}$ may be any alkyl, haloalkyl, aryl, or substituted aryl group which makes the sulfonate ester terminating group an effective initiator of the polymerization reaction. $R^{10}$ is preferably $CH_3C_6H_5$—. Any suitable synthetic method may be used to obtain the block copolymer.

In one preferred method, oxazine or oxazoline monomers are reacted with the sulfonate ester-terminated polythioether or polyalkylene glycol in a sealed tube at a temperature between about 25° C. and 250° C. Temperatures between 100° C. and 200° C. are preferred to minimize reaction times and potential side product formation. In this temperature range, a reaction time of about 1 hr to 100 hr will be sufficient. Any suitable method may be used to separate the block copolymer produced, for example, ion exchange chromatography or size exclusion chromatography. One convenient method is to precipitate the desired copolymer from the reaction mixture in an solvent in which the copolymer is not soluble, for example, preferably diethyl ether, and drying the product thus produced.

Any method known in the art may be used to synthesize the sulfonate ester-terminated polythioether or polyalkylene glycol. One method is to react a polythioether or polyalkylene glycol with a sulfonyl halide, for example tosyl chloride, in the presence of a tertiary amine such as pyridine. The formed amine hydrohalide salt is then removed from the desired sulfonate ester-terminated polythioether or polyalkylene glycol. A second method is to react a polythioether or polyalkylene glycol with a sulfonyl halide in aqueous solution under basic conditions followed by extraction and drying to yield the desired sulfonate ester-terminated polythioether or polyalkylene glycol.

Synthesis of polyoxazolines which contain polyethylene imine polyethylene oxide polythioether or thioether linkage-containing polyalkylene glycol pendant chains can be effected by any polymerization process known in the art, for example, ring opening polymerization, using a monomer unit of the general formula (III) as described above.

For example, polyethylene oxide, polythioether and polyethylene imine side chain-containing polyoxazolines may be synthesized from precursors prepared by the following scheme Scheme I

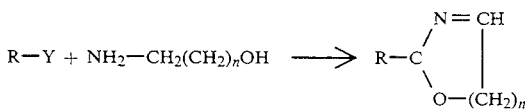

wherein R is as defined earlier herein, and Y is CN or COOH.

Ring opening polymerization may be effected by the following general synthetic scheme Scheme II

Thus, the oxazine and oxazoline monomer units as present in polymerized form have the structure shown at the right side of Scheme II.

Copolymers of oxazines, oxazolines, or combinations thereof, and polyethylene imine, amine-terminated polyethylene oxide, polythioethers, thioether linkage-containing polyalkylene glycols, or mixtures thereof may be synthesized using a similar ring opening polymerization as shown in Scheme (II). Polyethylene imine, amine-terminated polyethylene oxides, polythioethers and thioether linkage-containing polyalkylene glycols, or mixtures thereof, are reacted stoichiometrically in the presence of an acid catalyst at elevated temperatures, as in Scheme (I), with the monomeric species shown in structure (II) above.

IV. Methods of Making Conductive Composites and Uses Thereof.

Conductive composites of Nylon 12 or other suitable synthetic substrates may be made by melting the substrate in a preheated mixing device capable of providing high shear mixing and combining therein a polymer of the invention. In addition, a block copolymer of oxazine, oxazoline, or combinations thereof, and polyalkylene glycol, may be used. A preferred method of manufacture is to first combine a polymer with a plasticizer, preferably Jeffamine ® (Texaco) (polyoxyalkyleneamine) and a carbon powder in an organic solvent, for example, petroleum naphtha. This mixture is then heated at temperatures between about 100° C. and 250° C. for a duration of between about 1 to 25 hr after which the solvent is removed and the product recovered. This product is then melted by combining with the melted substrate and mixing in a device capable of high shear mixing. At this point, a polymer of the invention may be added to the mixture, as may plasticizer and/or carbon powder. Furthermore, conductive polymers may be added to the composite formulation. Examples of such conductive polymers include polypyrrole, polyaniline, polyisothionaphthene, polythiophene, and the like, which may or may not be substituted with carboxylate substituents. The final conductive composite product may be recovered after further mixing at between about 100° C. and 250° C. for between about 5 and 120 min.

The antielectrostatic agents and conductive composites of the invention disclosed herein have enhanced mechanical and electrical properties compared with previously disclosed antieletrostatic agents, untreated substrates and carbon-filled antistatic substrates. The antielectrostatic agents are thermally stable and compatible with such hydrophobic substrate materials as Nylon 12 and are thus readily processable with such materials, even at high temperatures. The antielectrostatic agents of the invention are resistant to swelling in organic fluids and are useful in preparing composite materials which have superior mechanical properties. While not wishing to be bound by theory, it is postulated that the polyoxazine and polyoxazoline blocks impart compatibility of the block copolymer with the substrate. The polythioether and polyoxyalkylene blocks are postulated to impart the enhanced electrical properties.

The novel composites of the invention possess improved mechanical properties, such as higher modulus and lower elongation. They are flexible and malleable. Their structure will not become compromised at high temperatures or when subject to routine stress as a result of end-product manufacturing or use. It is a significant advantage that the composites disclosed are more conductive than untreated substrate or carbon-filled substrate, thus alleviating static discharge. Surface resistivity of less than $10^5$ ohm/sq and volume resistivity of less than $10^8$ ohm.cm are routinely measured in composites of the invention.

As a result of the unique combination of mechanical and electrical properties possessed by the novel conductive composites of the invention, their utility is broad and manifold. For example, the composites may be used for fuel lines and other fuel systems parts where their antistatic property is of particular significance. In addition, the antistatic property of the inventive composites is advantageous as applied to any use in which static electrical charge build-up is a concern. For example, the inventive composites are useful in semiconductor manufacturing where it is imperative to prevent static electrical charges from accumulating and thereby preclude not only electrical complications but also particulate contamination during the manufacturing process. The composites are similarly useful in the manufacture of rollers for xerographic applications and in conjunction with electrophotographic toners and developers. The composites also find utility as the material from which radiocassette tapes, video cassette tapes, compact discs and phonograph records are fabricated. In addition, household goods such as tiles, rugs and carpets may be manufactured using the novel composite materials. In consideration of the antistatic property of the composites, they may find utility in electromagnetic shielding applications; interposing a composite between a subject and a source of microwaves, radiowaves, UHF, VHF, or the like, emanating from satellites, power lines, home appliances, etc., can reduce exposure of the subject to the electromagnetic radiation by from 90% to 99%. Because of the enhanced mechanical properties of the composites, they may be used in conjunction with other materials to enhance or reinforce the mechanical properties of the final product.

In sum, the novel antielectrostatic agents of the invention possess advantages such as thermal stability and processability with Nylon 12 or other polymeric materials. The novel composites formed from these antielectrostatic agents possess easily improved mechanical properties, are manufactured from readily available starting materials, and have enhanced antielectrostatic properties as a result of decreased resistivity.

The following examples are intended to provide those of ordinary skill in the art with a complete disclosure and description of how to make and use the novel antielectrostatic of the invention, and are not intended to limit the scope of what the inventors regard as their invention in any way. Efforts have been made to ensure accuracy with respect to numbers used (e.g., amounts, temperatures, etc), but some experimental error and deviation should, of course, be allowed for. Unless indicated otherwise, parts are parts by weight, temperatures are in degrees centigrade, and pressure is at or near atmospheric.

Example 1

Preparation of Block Copolymers of Thioglycol Bistosylate and 2-Ethyl-2-oxazoline (a) Synthesis of bistosylate of thioglycols: Bistosylates of two sulfur-containing (or thioether linkage-containing) polyglycols, (1) Permapol® P-900 (Products Research & Chemical Corp., Glendale, Calif.), and (2) Permapol® P-905 (Products Research & Chemical Corp., Glendale, Calif.), were synthesized. Two reported procedures were followed for the synthesis. See, U.S. Pat. No. 4,366,307 to Singh et al.; Satyam, A., and Narang, S.C., *Polymer Preprints,* American Chemical Society, Washington, D.C., meeting (Aug. 1992), page 122.

Method A: Tosyl chloride (114 g; Aldrich, Milwaukee, Wis.) was added to a stirred solution of Permapol® P-900 (molecular weight 500) (100 g) in 500 mL of pyridine under cooling with ice, and the mixture was stirred for 4 hours at the same temperature. After precipitation of pyridinium hydrochloride salt, the reaction mixture was further stirred at room temperature for 72 hours, and then poured into 500 mL of iced water. The product was extracted with chloroform (3×500 mL). The extract was washed five times with water (1 L×5), dried over magnesium sulfate, and evaporated to yield bistosylate of Permapol® P-900 as a heavy oil.

Method B: Sodium hydroxide (30 g) was dissolved in 200 Ml of water. To this solution was added tosyl chloride (57 g) and Permapol® P-905 (100 g, molecular weight 1000). The reaction mixture was stirred for 14 hours at room temperature. The reaction mixture was extracted with chloroform (3×500 mL), dried over magnesium sulfate and filtered. The chloroform was then evaporated to yield bistosylate of Permapol® P-900 as a heavy viscous oil.

Synthesis of the desired bistosylate by either Method A or Method B was confirmed by IR and NMR.

(b) Two block copolymers of 2-ethyl-2-oxazoline were then synthesized using the bistosylate of Permapol® P-900 synthesized in the preceding section.

Polymer 1: 2-Ethyl-2-oxazoline (20 mL; Aldrich) and bistosylate of Permapol® P-900 (5 g) were dissolved in 60 mL of acetonitrile. The mixture was placed in a glass tube, and the tube was then sealed. The sealed glass tube was immersed in a preheated oil bath (110° C.). The reaction was carried out for 18 hours at 110° C. After 18 hours, the tube was taken out of the oil bath and allowed to come to room temperature. It was then carefully broken and the reaction mixture poured into diethyl ether (200 mL). The precipitate was filtered and dried to provide the desired block copolymer.

Polymer 2: 2-Ethyl-2-oxazoline (40 mL) and bistosylate of Permapol® P-905 (16.5 g) were dissolved in 60 mL of acetonitrile. The mixture was placed in a glass tube and the tube was sealed. The sealed glass tube was immersed in a preheated oil bath (110° C.). The reaction was carried out for 18 hours at 110° C. After 18 hours, the tube was taken out of the oil bath and allowed to come to room temperature. It was then carefully broken and the reaction mixture poured into diethyl ether (200 mL). As before, the precipitate was filtered and dried to provide the desired block copolymer. The block copolymers were characterized by NMR.

Example 2

Preparation of Nylon 12 and Polythioether-Carbon Composites

The block copolymers prepared in the preceding Example were used to prepare a Nylon 12 composite as follows. The copolymers, or, for comparison purposes, other polymers, such as Permapol® P-905 or Polybrene® (Aldrich), carbon powder XC72R were mixed in petroleum naphtha (150 cc, Union Oil), either in the presence or absence of Jeffamine® ED2001 or ED6000. The Jeffamine® ED-series materials are polyether diamines based on a polyethylene oxide backbone. Jeffamine® ED2001 has a molecular weight of approximately 2000. Jeffamine® ED6000 has a molecular weight of approximately 6000. The amounts of each component are shown in Table 1. The mixture was heated to 180° C. and the heat treatment was continued for 6 hours at this temperature. After heat treatment, the solvent was removed and a black solid mixture was recovered.

Nylon 12 (Atochem, Birdsboro, Pa.), in amounts shown in Table 1, was placed in a preheated (180° C.) Brabender mixer bowl and allowed to melt with high shear mixing. Once the Nylon 12 was melted, the black solid mixture obtained in the preceding step (8.0 g) was added and allowed to melt with high shear mixing. Finally, carbon XC72R (8.0 g) was added and the mixing was continued at 180° C. to 200° C. for 20 more minutes. The bowl was then opened and the desired composite product was recovered.

The electrical conductivity of the composite was measured using a Hiresta IP High Resistance Resistivity Meter (Mitsubishi Petrochemical Co., Inc., Tokyo) according to the manufacturer's instructions, and the values obtained for surface and volume resistivities are shown in Table 1. For comparative purposes, surface resistivities of an ethylene oxide/propylene oxide random copolymer incorporated into a semirigid PVC injection molding compound can be $10^{12}$ ohm/sq (see, European Patent Publication No. 287,092).

Example 3

Preparation of Composites Containing a Conductive Polymer

The block copolymer prepared in Example 1 was used to prepare a Nylon 12 composite containing a conductive polymer using the method described in Example 2. The conductive polymer, polypyrrole, was added to the mixture of copolymer and carbon powder in the amounts shown in Table 1. The electrical conductivity of the composite was measured as described in Example 2 and the values obtained for surface and volume resistivities are shown in Table 1.

Example 4

Preparation of Nylon 12 and Polyethyl Oxazoline-Carbon Composites

The methods described in Example 2 were used to make composites using polyethyl oxazoline (MW=50,000) instead of a polythioether copolymer. In some composite formulations, N-methyl pyrrolidone was mixed along with the polymer, Jeffamine® and carbon powder as a rheology modifier. In the formulation of some composites, Shell 360 was used in place of petroleum naphtha. The amounts of each component of the composite formulation are shown in Table 2. The electrical conductivity of the composites was measured as described in Example 2 and the values obtained for surface and volume resistivities are shown in Table 2.

Example 5

Preparation of Hytrel 5526 and Polyethyl Oxazoline-Carbon Composites

The procedure of Example 4 was repeated substituting Hytrel 5526 for Nylon 12. The electrical conductivity of the composite was measured as described in Example 2 and the values obtained for surface and volume resistivities are shown in Table 2.

Example 6

Preparation of Nylon 6 and Polyethyl Oxazoline-Carbon Composites

The procedure of Example 4 was repeated substituting Nylon 6 for Nylon 12. The electrical conductivity of the composite was measured as described in Example 2 and the values obtained for surface and volume resistivities are shown in Table 2.

Example 7

Preparation of Styrene and Polyethyl Oxazoline-Carbon Composites

The procedure of Example 4 was repeated substituting styrene for Nylon 12. The electrical conductivity of the composite was measured and the values obtained for surface and volume resistivities are shown in Table 2.

Example 8

Preparation of Nylon 6 and Silicon Rubber-Carbon Composites

The procedure of Example 4 was repeated substituting Nylon 6 for Nylon 12 and silicon rubber 7720 for polyethyl oxazoline. The electrical conductivity of the composite was measured as described in Example 2 and the values obtained for surface and volume resistivities are shown in Table 2.

Example 9

Preparation of Nylon 6 and Tri-fluoropropyl Siloxane-Carbon Composites

The procedure of Example 4 was repeated substituting Nylon 6 for Nylon 12 and tri-fluoropropyl siloxane for polyethyl oxazoline. The electrical conductivity of the composite was measured as described in Example 2 and the values obtained for surface and volume resistivities are shown in Table 2.

TABLE 1

FORMULATION AND RESISTIVITES OF NYLON 12 AND POLYTHIOETHER-CARBON COMPOSITES WITH AND WITHOUT A CONDUCTIVE POLYMER

| Sample #D25 13024- | Nylon 12[1] (g) | Carbon (Cabot XC72R) (g) | Polymer (g) | Amine (g) | Conductive Polymer (g) | Resistivity OHM/SQ Surface | Resistivity OHMs CM Volume |
|---|---|---|---|---|---|---|---|
| 3 | 49 | 1.0 | — | | | | |
| 4 | 39.84 | 0.16 | — | | | $6.3 \times 10^{15}$ | $1.2 \times 10^{15}$ |
| 5 | 39.84 | 0.16 | 3.98 Copolymer 1[2] | | | $2.5 \times 10^{13}$ | $6.9 \times 10^{14}$ |
| 6 | 39.84 | 0.16 | 3.98 Copolymer 2[2] | | | $6.3 \times 10^{12}$ | $9.3 \times 10^{13}$ |
| 7 | 20.0 | — | — | | | $6.3 \times 10^{12}$ | $7.7 \times 10^{14}$ |
| 8 | 39.84 | — | 3.98 Copolymer 2 | | | $6.3 \times 10^{12}$ | $1.3 \times 10^{15}$ |
| 9 | 39.84 | 0.16 | 7.96 Copolymer 2 | | | $6.3 \times 10^{12}$ | $4.5 \times 10^{13}$ |
| 10 | 39.84 | — | 3.98 Permapol ® P-855 | | | $1.0 \times 10^{16}$ | $3.5 \times 10^{14}$ |
| 11 | 39.84 | 0.8 | 3.98 Permapol ® P-855 | | | $2.3 \times 10^{15}$ | $7.2 \times 10^{15}$ |
| 12 | 40.0 | 4.0 | — | | | $2.3 \times 10^{15}$ | $7.9 \times 10^{14}$ |
| 13 | 40.0 | 4.0 | 4.0 Permapol ® P-855 | | | $4.0 \times 10^{16}$ | $5.7 \times 10^{14}$ |
| 17 | 40.0 | 0.8 | — | 4.0 JA[3] ED2001 | | $4.0 \times 10^{8}$ | $1.1 \times 10^{12}$ |
| 18 | 40.0 | — | 4.0 Polybrene ® | | | $1.3 \times 10^{11}$ | $2.9 \times 10^{12}$ |
| 19 | 40.0 | 0.8 | — | 8.0 JA ED2001 | | $2.5 \times 10^{9}$ | $1.7 \times 10^{11}$ |
| 20 | 40.0 | 0.8 | — | — | 8.0 Polypyrrole | $2.5 \times 10^{15}$ | $1.3 \times 10^{14}$ |
| 21 | 40.0 | 0.8 | — | 4.0 JA ED2001 | 8.0 Polypyrrole | $2.5 \times 10^{15}$ | $1.3 \times 10^{14}$ |
| 22 | 40.0 | 0.8 | — | 4.0 JA ED6000 | | $2.5 \times 10^{10}$ | $4.6 \times 10^{12}$ |
| 23 | 40.0 | 0.8 | — | 8.0 JA ED6000 | | $4.0 \times 10^{9}$ | $1.9 \times 10^{12}$ |
| 24[4] | — | 10.0 | — | 30.0 JA ED2001 | | | |
| 25 | 40.0 | 2.7 (24) → | | 8.0 JA ED6000 | | $2.5 \times 10^{11}$ | $1.6 \times 10^{12}$ |
| 26 | 40.0 | 10.7 (24) + 5.3 UT[5] → | | 8.0 JA ED2001 | | $8.0 \times 10^{9}$ | $7.6 \times 10^{10}$ |
| 27[6] | — | 25.0 | — | 0.25 ODA[8] | | | |
| 28 | 40.0 | 4.0 (27) | — | 4.0 JA ED2001 | | $6.3 \times 10^{9}$ | $2.7 \times 10^{2}$ |
| 29 | 40.0 | 8.0 (27) | — | 4.0 JA ED2001 | | $8.0 \times 10^{11}$ | $1.3 \times 10^{12}$ |
| 30 | 40.0 | 16.0 (24) | — | 5.0 JA ED2001 | | $4.0 \times 10^{10}$ | $1.4 \times 10^{12}$ |
| 31 | 40.0 | 8.05 (24) + 7.95 UT | — | 2.0 JA ED2001 | | $4.0 \times 10^{4}$ | $3.7 \times 10^{6}$ |
| 32 | 48.0 | 4.0 (24) + 4.0 UT | — | 1.0 JA ED2001 | | $2.5 \times 10^{15}$ | $6.8 \times 10^{12}$ |
| 33 | 48.0 | 4.0 | | JA | | $1.6 \times 10^{10}$ | $1.7 \times 10^{10}$ |

TABLE 1-continued
FORMULATION AND RESISTIVITES OF NYLON 12 AND POLYTHIOETHER-CARBON COMPOSITES WITH AND WITHOUT A CONDUCTIVE POLYMER

| Sample #D25 13024- | Nylon 12[1] (g) | Carbon (Cabot XC72R) (g) | Polymer (g) | Amine (g) | Conductive Polymer (g) | Resistivity OHM/SQ Surface | Resistivity OHMs CM Volume |
|---|---|---|---|---|---|---|---|
| | | (24) + 4.0 UT | | ED2001 (24A) | | | |

[1] Unless otherwise noted.
[2] The structures of copolymers 1 and 2 are

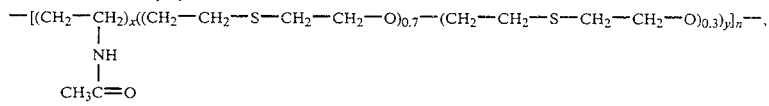

synthesized from a polythioether with a MW = 500 or 1000, respectively.
[3] Jeffamine ®.
[4] Cabot Carbon XC72R was treated by stirring with Jeffamine ® ED2001 at 200° C. for 2 hr. Water was then removed with a Stark trap. The treated Carbon XC72R was cooled and the solvent removed with a Roto-vac. Final solvent removal was effected by heating the sample in a vacuum oven at 100–110° C. Samples thus treated were used in subsequent experiments as indicated by the sample numbers in parentheses.
[5] Untreated.
[6] Cabot Carbon XC72R was treated in a manner similar to sample 13024-24 except that the solvent was Union Oil E (375 g).
[7] Octadecylamine

TABLE 2
FORMULATION AND RESISTIVITIES OF NYLON 12 AND POLYMER-CARBON COMPOSITES

| Sample ID | Nylon 12[1] (g) | (Cabot XC72R) (g) | Dispersing Polymer (g) | Plasticizer (g) | Rheology Modifier (g) | Solvent (ml) | OHM/SQ Surface | OHMs CM Volume |
|---|---|---|---|---|---|---|---|---|
| 1 | 36.0 | 8.96 Dried | 3.63 PEOX 50[2] | 1.81 JA[3] ED 2001 | | | $8.0 \times 10^4$ | $2.3 \times 10^6$ |
| 2 | 36.0 | 7.96 Dried | 3.63 PEOX 50 | 1.81 JA ED 2001 | | | $4.0 \times 10^4$ | $4.2 \times 10^6$ |
| 3 | 36.0 | 6.96 Dried | 3.63 PEOX 50 | 1.81 JA ED 2001 | | | $4.0 \times 10^{12}$ | $1.4 \times 10^{13}$ |
| 4 | 36.0 | 5.96 Dried | 3.63 PEOX 50 | 1.81 JA ED 2001 | | | $4.0 \times 10^5$ | $1.4 \times 10^7$ |
| 5 | 36.0 | 6.96 Dried | 3.63 PEOX 50 | 1.81 JA ED 2001 | | | $6.3 \times 10^4$ | $5.3 \times 10^5$ |
| 6 | 36.0 | 8.96 Dried | 3.63 PEOX 50 | 1.81 JA ED 2001 | 0.50 NMP[4] | | — | $2.1 \times 10^7$ |
| 7 | 42.5 | 8.96 Dried | — | — | 0.52 NMP | | $6.3 \times 10^{11}$ | — |
| 8 | 36.0 | 5.96 Dried | 3.63 PEOX 50 | 1.81 JA ED 2001 | 0.47 NMP | | $2.5 \times 10^6$ | $2.8 \times 10^7$ |
| 9 | 50.0 | 12.41 Dried | 4.91 PEOX 50 | 2.51 JA ED 2001 | | | $6.3 \times 10^5$ | $1.7 \times 10^6$ |
| 10 | 50.0 | 12.45 Dried | 4.91 PEOX 50 | 2.51 JA ED 2001 | 0.70 NMP | | $6.3 \times 10^5$ | $4.2 \times 10^5$ |
| 11 | 50.0 | 6.96 Dried | 4.91 PEOX 50 | 2.51 JA ED 2001 | 0.64 NMP | | $2.5 \times 10^6$ | $4.2 \times 10^9$ |
| 12 | 50.0 | 12.41 Dried | 4.91 PEOX 50 | — | 0.67 NMP | | $2.5 \times 10^4$ | $4.1 \times 10^6$ |
| 13 | 50.0 | 6.45 Dried | 3.91 PEOX 50 | 2.51 JA ED 2001 | 0.63 NMP | | $3.2 \times 10^8$ | $2.9 \times 10^8$ |
| 14 | 50.0 | 6.45 Dried | 3.91 PEOX 50 | — | 0.60 NMP | | $4.0 \times 10^8$ | $4.2 \times 10^8$ |
| 15 | 50.0 | 6.45 Dried | 3.91 PEOX 50 | — | 0.60 TBP[5] | | $2.5 \times 10^{15}$ | $2.9 \times 10^{12}$ |
| 16[6] | — | 10.0 | 20.0 PEOX 50 | | | 300 Shell 360 | | |
| 17 | 40.0 | 8.1 (16) +7.9 UT[7] | — | 2.0 JA ED 2001 | | | $1.6 \times 10^4$ | $2.2 \times 10^6$ |
| 18 | 36.0 | 7.2 (16) | | 1.8 JA | | | $4.0 \times 10^{15}$ | $4.4 \times 10^{13}$ |

TABLE 2-continued

FORMULATION AND RESISTIVITIES
OF NYLON 12 AND POLYMER-CARBON COMPOSITES

| Sample ID | Nylon 12[1] (g) | (Cabot XC72R) (g) | Dispersing Polymer (g) | Plasticizer (g) | Rheology Modifier (g) | Solvent (ml) | Resistivity OHM/SQ Surface | Resistivity OHMs CM Volume |
|---|---|---|---|---|---|---|---|---|
| 19[8] | — | +5.2 UT 10.0 Dried | ED 2001 30 PEOX 50 | | | 300 Shell 360 | | |
| 20 | 36.0 | — | 14.4 (19) | | | | $3.2 \times 10^{15}$ | $1.1 \times 10^{15}$ |
| 21 | 36.0 | 7.2 Dried | | | | | $2.5 \times 10^{5}$ | $1.8 \times 10^{6}$ |
| 22 | 36.0 | 5.0 Dried | 7.2 (19) | | | | $3.2 \times 10^{15}$ | $4.2 \times 10^{14}$ |
| 23 | 36.0 | 5.5 Dried | 7.2 (19) | | | | $3.2 \times 10^{15}$ | $4.1 \times 10^{13}$ |
| 24 | 36.0 | 6.0 Dried | 7.2 (19) | | | | $3.2 \times 10^{15}$ | $4.2 \times 10^{13}$ |
| 25 | 36.0 | 6.6 Dried | 7.2 (18) | | | | $3.2 \times 10^{15}$ | $4.2 \times 10^{13}$ |
| 26 | 36.0 | 7.2 Dried | 7.2 (18) | | | | $1.3 \times 10^{12}$ | $8.8 \times 10^{12}$ |
| 27 | 36.0 | 7.7 Dried | 7.2 (18) | | | | $3.2 \times 10^{15}$ | $4.1 \times 10^{13}$ |
| 28 | 36.0 | 9.6 Dried | 4.8 PEOX 50 | | | | $3.2 \times 10^{15}$ | $8.2 \times 10^{12}$ |
| 29 | 36.0 Hytrel 5526 | 7.15 Dried | 7.2 (16) | 1.8 JA ED2001 | | | $2.5 \times 10^{4}$ | $4.5 \times 10^{5}$ |
| 30 | 36.0 Nylon 6 | 7.15 Dried | 7.25 (16) | 1.8 JA ED2001 | | | — | — |
| 31 | 36.0 Styrene | 7.25 Dried | 7.25 (16) | 1.8 JA ED2001 | | | $8.0 \times 10^{4}$ | $1.2 \times 10^{6}$ |
| 32 | 36.0 | 7.15 Dried | 7.25 (16) | 1.8 JA ED2001 | | | $8.0 \times 10^{11}$ | $1.2 \times 10^{14}$ |
| 33 | 40.0 Nylon 6 | 0.5 Not Dried | 4.0 Silicon Rubber 7720 | | | | $2.5 \times 10^{15}$ | $3.0 \times 10^{14}$ |
| 34 | 40.0 Nylon 6 | | 4.0 TFPS[9] | | | | — | — |
| 35 | 36.0 | 8.15 Dried | 6.25 (5) | | | | $2.5 \times 10^{15}$ | $4.2 \times 10^{13}$ |
| 38 | 36.0 | 8.86 Dried | 3.63 PEOX 50 | 1.8 JA ED2001 | | | $8.0 \times 10^{4}$ | $2.3 \times 10^{6}$ |
| 40 | 36.0 | 10.77 Dried | 3.63 PEOX 50 | | | | $1.6 \times 10^{4}$ | $2.1 \times 10^{6}$ |
| 41 | 36.0 | 8.86 Undried Carbon | 3.63 PEOX 50 | 1.8 JA ED2001 | | | $1.6 \times 10^{4}$ | $1.7 \times 10^{6}$ |
| 42 | 37.8 | 8.86 Dried | 3.63 PEOX 50 | | | | $4.0 \times 10^{6}$ | $4.2 \times 10^{6}$ |
| 43 | 39.6 | 8.86 Dried | — | 1.81 JA ED 2001 | | | $8.0 \times 10^{11}$ | $1.3 \times 10^{12}$ |
| 44 | 36.0 | 8.86 Dried | 2.5 PEOX 50 | | | | $4.0 \times 10^{5}$ | $1.7 \times 10^{7}$ |
| 47 | 36.0 | 8.86 Dried | 1.81 PEOX 50 | | | | $1.6 \times 10^{10}$ | $2.8 \times 10^{10}$ |

[1]Unless otherwise noted.
[2]Polyethyl oxazoline (MW = 50,000).
[3]Jeffamine ®.
[4]N-methyl pyrrolidone
[5]Tributylphosphate.
[6]Treated as in sample no. 13024-24 (see, Table 1)
[7]Untreated.
[8]Treated as in sample no. 13024-24 (see, Table 1)
[9]Tri-fluoropropyl siloxane.

We claim:

1. A composite of a first polymeric material and an antielectrostatic agent comprising a copolymer comprising:

(a) a first block formulated from monomer units of the structure

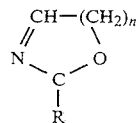

wherein n is 1 or 2, and R is a substituent selected from the group consisting of hydrogen and a $C_1$–$C_{40}$ side chain, wherein the side chain is a linear or branched aliphatic hydrocarbon radical optionally containing 1 to 3 ether, imine and/or sulfide linkages, an alicyclic or aromatic hydrocarbon radical, polyethylene imine, a polyethylene oxide, a polythioether or a thioether linkage-containing polyalkylene glycol; and (b) a second block comprising a thioether linkage-containing polyalkylene glycol.

2. The composite of claim 1, wherein the copolymer is an A-B-A block copolymer, and wherein the A block is a polyoxazoline and wherein the B block is a thioether linkage-containing polyalkylene glycol.

3. The composite of claim 2, wherein said copolymer has a molecular weight in the range of about 500 to about 50,000.

4. The composite of claim 3, wherein the ratio of A block to B block is in the range of about 1:1 to about 100:1.

5. The composite of claim 1, wherein the first polymeric material is selected from the group consisting of Nylon 12, polyester and polystyrene.

6. The composite of claim 1, comprising 70 wt. % to about 90 wt. % first polymeric material and about 30 wt. % to about 10 wt. % antielectrostatic agent.

7. The composite of claim 1, further comprising a conductive polymer.

8. The composite of claim 7, wherein the conductive polymer is polypyrrole.

9. The composite of claim 1, further comprising carbon.

10. A composite of a first polymeric material and an antielectrostatic agent comprising a copolymer comprising:

(a) a first block formulated from monomer units of the structure

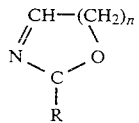

wherein n is 1 or 2, and R is a substituent selected from the group consisting of hydrogen and a $C_1$–$C_{40}$ side chain, wherein the side chain is a linear or branched aliphatic hydrocarbon radical optionally containing 1 to 3 ether, imine and/or sulfide linkages, an alicyclic or aromatic hydrocarbon radical, polyethylene imine, a polyethylene oxide or a polythioether; and (b) a second block formulated from monomer units of the structure

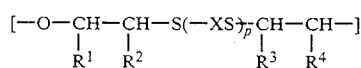

wherein $R^1$, $R^2$, $R^3$ and $R^4$ are independently selected form the group consisting of hydrogen, and lower alkyl, X is —$R^m$—$(Z)_l$—$R^n$ wherein $R^m$ and $R^n$ are branched or linear lower alkylene, Z is O or S, l is 0 or 1 and p is 0 or 1.

11. The composite of claim 10 wherein the copolymer is an A-B-A block copolymer, and wherein the A block is a polyoxazoline.

12. The composite of claim 10, wherein said copolymer has a molecular weight in the range of about 500 to about 50,000.

13. The composite of claim 11, wherein the ratio of A block to B block is in the range of about 1:1 to about 100:1.

14. The composite of claim 10, wherein the first polymeric material is selected from the group consisting of Nylon 12, polyester and polystyrene.

15. The composite of claim 14, wherein the first polymeric material is Nylon 12.

16. The composite of claim 10, comprising about 70 wt. % to about 90 wt. % first polymeric material and about 30 wt. % to about 10 wt. % antielectrostatic agent.

17. The composite of claim 10, further comprising a conductive polymer.

18. The composite of claim 17, wherein the conductive polymer is polypyrrole.

19. The composite of claim 10, further comprising carbon.

20. A composite of a first polymeric material and an antielectrostatic agent comprising a polymer formulated from monomer units of the structure

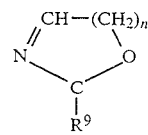

wherein n is 1 or 2, and $R^9$ is selected from the group consisting of polyethylene imine, polyethylene oxide, polythioethers, thioether-linkage polyalkylene glycols, and combinations thereof and, optionally, a conductive polymer.

21. The composite of claim 20, wherein said polymer has a molecular weight in the range of about 500 to about 50,000.

22. The composite of claim 20, wherein the first polymeric material is selected from the group consisting of Nylon 12, polyester and polystyrene.

23. The composite of claim 20, comprising about 70 wt. % to about 90 wt. % first polymeric material and about 30 wt. % to about 10 wt. % antielectrostatic material.

24. The composite of claim 20, further comprising a conductive polymer.

25. The composite of claim 24, wherein the conductive polymer is polypyrrole.

26. The composite of claim 20, further comprising carbon.

27. A composite of a first polymeric material and an antielectrostatic agent comprising a copolymer formulated from a first monomeric unit having the structure

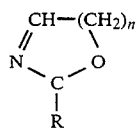

wherein n is 1 or 2, and R is a substituent selected from the group consisting of hydrogen and a $C_1$–$C_{40}$ side chain, wherein the side chain is a linear or branched aliphatic hydrocarbon radical optionally containing 1 to 3 ether, imine and/or sulfide linkages, or an alicyclic or aromatic hydrocarbon radical, and a second monomeric species comprising an amine-terminated polyethylene oxide.

28. The composite of claim 27, further comprising a conductive polymer.

29. The composite of claim 28, wherein the conductive polymer is polypyrrole.

30. The composite of claim 27, further comprising carbon.

* * * * *